United States Patent [19]

Ford et al.

[11] Patent Number: 5,052,224
[45] Date of Patent: Oct. 1, 1991

[54] SHIELDED SIGHT GAUGE FOR STORAGE TANKS

[75] Inventors: Glenn C. Ford, Huntingdon Valley; George H. Alexander, Jr., Hatfield; Robert J. Nyzio, Oreland, all of Pa.

[73] Assignee: Betz Laboratories, Inc., Trevose, Pa.

[21] Appl. No.: 597,313

[22] Filed: Oct. 15, 1990

[51] Int. Cl.$^5$ .................... G01F 23/03; G01F 23/00
[52] U.S. Cl. .................................. 73/325; 73/323; 73/328; 73/305; 285/31; 285/138; 137/377
[58] Field of Search .................. 73/325, 329, 332, 320, 73/323, 328, 305; 285/31, 138; 137/377; 33/126.4

[56] References Cited

U.S. PATENT DOCUMENTS

| | | | |
|---|---|---|---|
| 946,106 | 1/1910 | Burns | 73/329 |
| 1,005,424 | 10/1911 | Fay | 73/332 |
| 1,481,202 | 1/1924 | Hildreth | 73/326 |
| 1,701,914 | 2/1929 | Ernst | 73/328 |
| 2,083,794 | 6/1937 | Roby | 73/54 |
| 2,410,525 | 11/1946 | Richolson | 73/332 |
| 2,554,100 | 5/1951 | Facchini | 33/323 |
| 2,629,262 | 2/1953 | Victer | 73/326 |
| 2,707,396 | 5/1955 | Dupure | 73/326 |
| 2,871,700 | 2/1959 | Hilkene | 73/332 |
| 3,195,352 | 7/1965 | Corder | 73/332 |
| 3,212,334 | 10/1965 | Conlon | 73/326 |
| 3,820,397 | 6/1974 | Lyden | 73/328 |
| 4,022,062 | 5/1977 | Basel et al. | 73/325 |
| 4,039,208 | 8/1977 | Dernet et al. | 285/138 |
| 4,050,305 | 9/1977 | Evans et al. | 73/209 |
| 4,345,468 | 8/1982 | Jackson | 73/326 |
| 4,440,028 | 4/1984 | Ramlow | 73/861.55 |
| 4,652,024 | 3/1987 | Krohn | 285/138 |
| 4,693,117 | 9/1987 | Mills | 73/328 |

FOREIGN PATENT DOCUMENTS 2181510  4/1981  United Kingdom ............... 285/138

Primary Examiner—William A. Cuchlinski, Jr.
Assistant Examiner—Vinh Nguyen
Attorney, Agent, or Firm—Sutherland, Asbill & Brennan

[57] ABSTRACT

A vertically mountable sight gauge is comprised of one or more serially connectable sections for visually determining the level or the volume, or both, of liquid stored in a container. Each section has an upper and lower housing. Each housing has a passage therethrough with a first end and second end, is surrounded by a flange, and is attached to the ends of a straight length of substantially transparent, flexible pipe. The pipe is surrounded by a cylindrical, substantial transparent, rigid shield and a cylindrical, substantially transparent, rigid sleeve. The bottom end of the sleeve is surrounded by a shoulder. The outer diameter of the top end of the sleeve is less than inner diameter of the shield, such that the sleeve telescopically engages the shield. Biasing means bears against the bottom end of the shield and the sleeve's shoulder, surrounds and overlaps the sleeve, and urges the shield against the upper housing and the sleeve against the lower housing. The second end of the uppermost housing's passage is placed in communication with the interior upper region of the container, and the second end of the lowermost housing's passage is placed in communication with the interior lower region of the container. A float is placed in the pipe to improve the visibility of the height of the column of liquid contained. The upper housing's and lower housing's passages contain means for preventing the escape of the float without preventing the flow of liquid through the passages.

62 Claims, 4 Drawing Sheets

SHIELDED SIGHT GAUGE FOR STORAGE TANKS

BACKGROUND

1. Field of Invention

The invention concerns vertically mountable sight gauges for visually determining the level or the volume, or both, of liquid stored in a container. In particular, it concerns such sight gauges as have a substantially transparent pipe surrounded by a rigid, substantially transparent guard or shield.

2. Description of Prior Art

It is known that a sight gauge for visually determining the level of liquid stored in a container may comprise a substantially transparent pipe mounted vertically on the outside of the container, with the pipe being in communication with the container's interior. Usually, the upper end of the transparent pipe in a vertical sight gauge is in direct or indirect communication with the upper interior region of the container, and the lower end of the pipe is in direct or indirect communication with the lower interior region of the container. So arranged, the pressure of the atmosphere above the liquid in the container and that above the column of liquid in the pipe will at all times equalize, and the height of the column of liquid contained in the pipe will indicate the depth of the liquid stored in the container. If the ratio of the internal height of the container to the volume of the container is known, then the level of liquid in the sight gauge readily can be used to calculate the volume of liquid in the container. Indeed, volume graduations may be marked on, etched on, or otherwise directly applied to the gauge.

Often these sight gauges are subjected to considerable stress due to movement or changes in the dimensions of the container. The walls of the container, for example, may bulge during filling. Also, the container wall will inevitably expand or contract with changes in temperature. Tanks can also swell as a result of a build-up in the internal pressure, e.g., due to a rise in temperature of the tank's contents. Changes in atmospheric pressure can also affect the diameter of the container. The greater the size of the container, the greater is the effect of these changes in temperature, pressure, etc. that is transmitted to the sight gauge.

Sight gauges frequently are unable to withstand these stresses, and as a result they often break. Because of their exposure and fragility, they also have been frequently broken by accidental impact. The consequences can be severe. The contents of the container can leak out through the broken gauge, causing a direct economic loss of that commodity, as well as clean-up costs. Serious environmental damage may result as well. If the gauge suddenly ruptures while a worker is reading it or standing nearby, he or she can be seriously injured.

The prior art has attempted to protect sight gauges against impact damage by placing whole or partial shields, or guards, around them. These shields have also served to provide some protection to observers and nearby workers. The shields are not without problems, however.

A type of shield that is commonly used today is comprised of two longitudinal, semicircular halves, which are banded together such that they surround the sight gauge's transparent pipe. The pieces are substantially transparent and rigid and are made of a polymeric resin such as acrylic resin. Each end of the assembled shield is fitted to a housing in which the sight gauge pipe is also mounted. While these shields protect the sight gauge pipes from impact damage, the shields themselves frequently break from the stresses created by deformation of the container walls. Experience has shown it to be a costly and time-consuming process to replace the cracked or broken shields. Replacement is necessary, however, to give the center pipe maximum protection against impact damage—also, to serve as a containment vessel if a center pipe seal should fail or if the center pipe should rupture due to stress or wear. Use of this type of shield requires an expensive inventory of parts. Usually, the length of the sight gauge is approximately equal to the height of the container. Because storage tanks vary in height, the plastic shield halves must be kept in supply in a variety of lengths.

One sight gauge guard described in the patent literature is not as susceptible to stress breakage as the plastic shields just described, but it has other shortcomings. We refer to the sight gauge guard described in U.S. Pat. No. 1,701,914 to Ernst. Ernst discloses a water gauge for boilers. A transparent glass pipe is shielded by two telescoping metal guards. The guards are sprung snugly into housings surrounding the ends of the pipe. Each guard has a semicircular cross-section, so that it does not completely surround the pipe. This permits the observer to read the level of the liquid in the pipe by standing opposite the guards. To facilitate readings, the guards may be rotated to any position. To provide maximum protection against impact damage, the guards are swung around to their outside positions when a reading is not being taken.

One problem with the Ernst guards is that they do not protect the worker when he or she is reading the sight gauge, nor do they provide 360° protection against blows to the transparent center tube. Moreover, the guards will not prevent leakage if the center tube breaks or its seals fail.

SUMMARY OF THE INVENTION

We have invented an improved form of sight gauge which reduces the severity and frequency of sight gauge guard damage, while providing excellent protection against impact damage. The guard also serves as a temporary secondary seal in the event of failure of a sight gauge seal, or a stress rupture of the sight gauge center pipe. Our sight gauges are comprised of one or more sections. If more than one section is used, the sections are serially connected. Central to each section is a substantially transparent length of flexible pipe. Each end of the pipe is attached to a housing, and each housing has a passage therethrough which has a first end and a second end. An end of the pipe is attached to the first end of each housing's passage. A flange, which is substantially concentric with the first end of the passage, surrounds each housing.

The flexible pipe is surrounded by a guard comprised of a substantially transparent, rigid shield and a substantially transparent, rigid sleeve. The shield and the sleeve each define continuous, inner and outer wall surfaces and have top and bottom ends; e.g., each is a hollow cylinder. Preferably, a plurality of spacers separate the shield's inner wall surface from the flexible pipe. Additionally, the bottom end of the sleeve is surrounded by a shoulder.

A biasing means bears against the shield's bottom end, surrounds and overlaps the sleeve, and bears against the sleeve's shoulder. The biasing means urges the shield into engagement with the upper housing, and urges the sleeve into engagement with the lower housing. The shield has a circumferential top edge which conforms to and abuts the upper housing's flange, and the sleeve's shoulder has a circumferential bottom edge which conforms to and abuts the lower housing's flange. Further, the sleeve telescopically engages the shield. Because the outer diameter of the sleeve is equal to or slightly less than the inner diameter of the shield, the biasing means bears against the shoulder, which has a greater outer diameter than the rest of the sleeve's outer wall surface. The shoulder is thereby urged to engage the lower housing's flange. It is preferred that the biasing means be a coil, compression spring.

When the gauge is mounted on the exterior of the container, the second end of the upper housing's passage is placed in communication with the upper interior region of the container, and the second end of the lower housing's passage is placed in communication with the lower interior region of the container. Depending on the height of the container, it may be desirable to construct a sight gauge of two or more sections, each comprising the housings, flexible pipe, shield, sleeve, spacers, and biasing means just described. If a multi-section sight gauge is utilized, the second end of the passage of the upper housing of the uppermost section is placed in communication with the interior of the upper region of the container, and the second end of the passage of the lower housing of the lowermost section is placed in communication with the interior of the lower region of the container. Preferably, the second end of the passage of the lower housing of any other section is placed in communication with the second end of the passage of the upper housing of the section immediately below it and the corresponding interior region of the container.

The upper housing's flange preferably has a width equal to or slightly greater than the shield's thickness. This configuration permits the shield's circumferential top edge to abut the upper housing's flange. Preferably, the lower housing's flange has a width equal to or slightly greater than the shoulder's thickness, so that the shoulder's circumferential bottom edge abuts the lower housing's flange.

Other preferred features of the sight gauge of the present invention are that the shield and the sleeve are cylindrical and that the sleeve is shorter than the shield. Preferably, the shield and the sleeve bear graduation markings, so that the approximate level or volume, or both, of the liquid stored in the container readily can be determined. The shield and the sleeve may be graduated by etching or marking the graduations on the outer or inner wall surfaces of the shield and sleeve, or by applying decals depicting the graduations to the outer or inner wall surfaces of the shield and sleeve.

The container on which the sight gauge of the present invention is mounted can have a continuous, circumferential sidewall and bottom and top surfaces. Alternatively, the container can have two end caps and a continuous, circumferential sidewall. Regardless of the configuration, the container should be equipped with a fill opening, a drain opening, a drain pipe, and a drain valve located in the drain pipe to control the release of the liquid contents of the container. The drain pipe and drain valve can comprise elements of the means for placing the second end of the lower housing's passage in communication with the interior of the lower region of the container.

It is further preferred that the overall length of the flexible pipe (whether segmented or unsegmented) be approximately equal to the container's depth. The lower end of the pipe's lowermost section preferably is at approximately the same level as the lowest point in the interior of the lower region of the container. The upper end of the uppermost section preferably is at approximately the same level as the highest point in the interior of the upper region of the container. The second end of the uppermost housing's passage preferably is placed in communication with the container by means of an elbow-shaped pipe and means to control the flow of liquid from the container through the elbow-shaped pipe and into the second end of the uppermost housing's passage. The second end of the lowermost housing's passage preferably is placed in communication with the container by means of a T-shaped pipe and means to control the flow of liquid from the container into the lower inlet port of the pipe, from the flexible pipe into the upper inlet port of the pipe, and from the pipe's outlet port.

The shield and sleeve preferably are fabricated from a substantially transparent acrylic resin, and the flexible pipe preferably is fabricated from substantially transparent polyvinyl chloride. An opaque float preferably is placed inside the flexible pipe to mark the height of the column of liquid in the pipe. Preferably, the float is of a color (e.g., fluorescent orange) which makes it clearly visible to an observer. The upper and lower housings should be equipped with stopping means to prevent the float from exiting the second end of either housing's passage and passing into the container, as well as from being discharged with the container's contents. The stopping means must not prevent the flow of liquid through either passage.

It is further preferred that each housing is rotatable around an axis that is perpendicular to that of the flexible pipe. In order to remove a damaged shield or sleeve of a sight gauge section for repair or replacement, the shield is compressed against the biasing means, exposing the upper housing. If the means for placing the upper and lower housings in communication with the container are equipped with stop valves, these valves should be closed first. The flexible pipe can then be drained of liquid. The shield should be compressed against the biasing means, and the flexible pipe should be disconnected from the second end of the upper housing's passage. Once disconnected, the upper housing can be rotated off the axis of the flexible pipe. This permits the shield to be removed. If the spacers fit snugly around the flexible pipe and have an outer diameter that is slightly less than the shield's inner diameter, the spacers will not impede removal of the shield.

Although the spacers are placed such that they do not restrict the telescopic engagement of the shield and sleeve, their outer diameter is greater than the sleeve's inner diameter, and the sleeve cannot be removed over the spacers. In order to remove the sleeve, the flexible pipe must be disconnected from the lower housing as well. The sleeve should be raised until the lower housing is exposed, and the flexible pipe should be disconnected from the second end of the lower housing's passage. After the shield or the shield and the sleeve are removed and repaired or replaced, the sight gauge section should be reassembled in the reverse order to that by which it was disassembled.

REFERRING TO THE DRAWINGS

DETAILED DESCRIPTION AND PREFERRED EMBODIMENTS OF THE INVENTION

Figure 1:
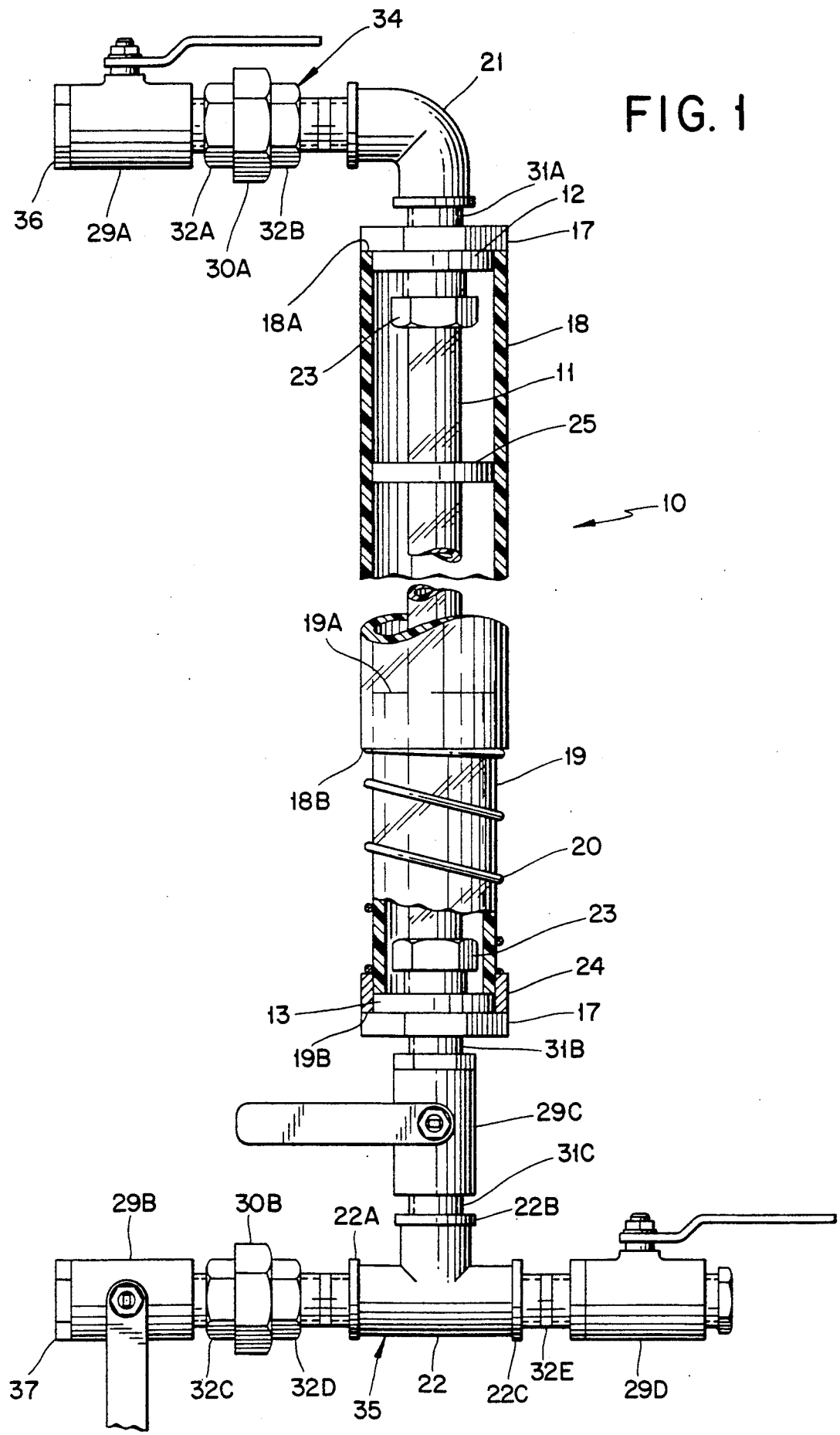
FIG. 1 is a side view of a single section sight gauge and preferred connecting means.

Referring to FIG. 1 of the drawings, the sight gauge, indicated generally as 10, is formed of a length of substantially transparent, flexible pipe 11 joined to an upper housing 12 and a lower housing 13. Flexible pipe 11 is formed of polyvinyl chloride and has an outer diameter of approximately 0.750 inch. Although housings 12 and 13 are depicted as made of metal, they may be fabricated from a suitable polymeric resin as well. Each housing 12 and 13 has an outer diameter of approximately 1.750 inches.

Figure 2:
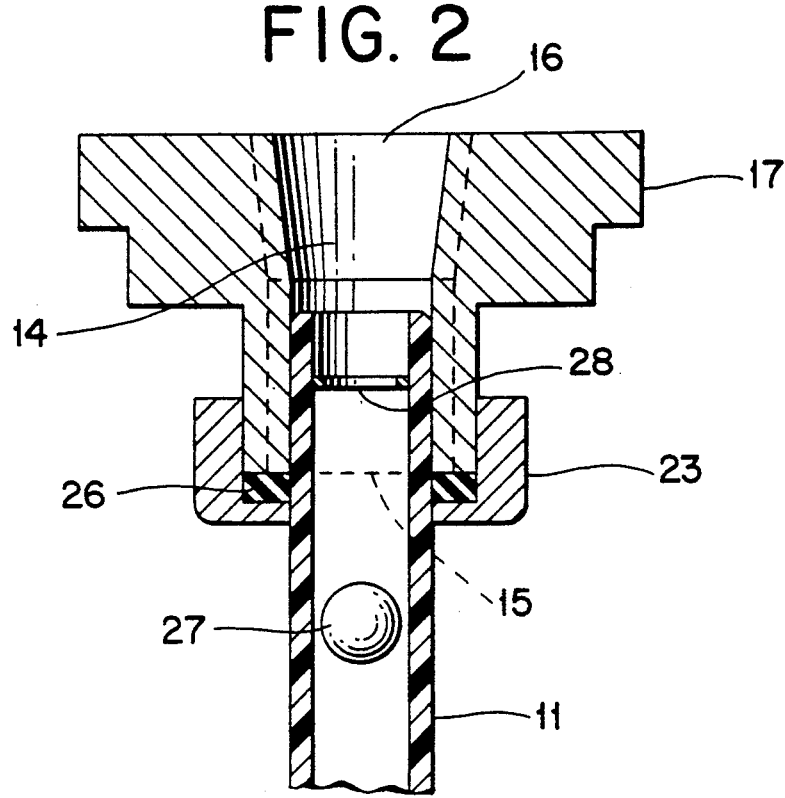
FIG. 2 is an enlarged, cross-sectional view of the upper housing of the gauge depicted in FIG. 1.

As shown in FIG. 2, each housing 12 and 13 has a passage 14 therethrough that has a first end 15 and a second end 16. One end of flexible pipe 11 is attached to first end 15 of upper housing 12; the other end of pipe 11 is attached to first end 15 of lower housing 13. Each housing 12 and 13 is surrounded by a flange 17. Flange 17 has an outer diameter of approximately 2.000 inches.

Referring again to FIG. 1, flexible pipe 11 is surrounded by a substantially transparent, rigid shield 18. Shield 18 is cylindrical. It is fabricated from acrylic resin, and its wall is approximately 0.125 inch thick. Shield 18 has a top end 18A and a bottom end 18B. The inner diameter of shield 18 is approximately 1.750 inches, such that the shield's top end 18A conforms to, and surrounds, upper housing 12 and abuts flange 17 of upper housing 12.

Flexible pipe 11 is also surrounded by a substantially transparent, rigid sleeve 19. Sleeve 19 is also cylindrical and fabricated from acrylic resin. Sleeve 19 has a top end 19A and a bottom end 19B, and its wall is also approximately 0.125 inch thick. Sleeve 19 has a shoulder 24 surrounding its bottom end 19B. The outer diameter of the sleeve's top end 19A is approximately 1.740 inches—i.e., slightly less than the inner diameter of the shield's bottom end 18B. This difference in diameters permits sleeve 19 to engage shield 18 telescopically. The inner diameter of the sleeve's shoulder 24 is approximately 1.750 inches, such that it conforms to, and surrounds, lower housing 13 and abuts flange 17 of lower housing 13.

A coil, compression spring 20, fabricated from a metal alloy such as steel, bears against the shield's bottom end 18B, overlaps and surrounds sleeve 19, and bears against shoulder 24. Spring 20 urges shield 18 against upper housing 12 and urges sleeve 19 against lower housing 13. The inner wall surface of shield 18 is separated from flexible pipe 11 by two ring-shaped spacers 25. Spacers 25 are fabricated from black neoprene rubber and are placed so that they do not interfere with the telescopic engagement of shield 18 and sleeve 19. Each spacer 25 is approximately 0.250 inch thick and has an inner diameter of approximately 0.750 inch, such that spacer 25 fits snugly around flexible pipe 11. The outer diameter of each spacer 25 is approximately 1.625 inches, slightly less than the inner diameter of shield 18. When sight gauge 10 is subjected to abnormal temperatures, pressures, or stresses (e.g., while filling or draining the container), pipe 11 may flex or bow. Spacers 25 limit the deformation of pipe 11 and prevent damage to or wear on pipe 11 due to contact with the inner wall surfaces of shield 18. Moreover, because spacers 25 do not contact the inner wall of shield 18, minor movement of shield 18 does not place stresses on the attachment between pipe 11 and upper housing 12 or lower housing 13.

Second end (not shown) of upper housing 12 is placed in communication with the interior of the upper region of the container by means of an upper piping assembly 34. This upper piping assembly 34 is comprised of a 90° elbow-shaped pipe 21, a one-half inch ball valve 29A, and associated fittings. The inlet side of ball valve 29A is fitted with a coupling 36 for placing ball valve 29A in communication with the interior of the upper region of the container. The outlet side of ball valve 29A is connected to the inlet side of a one-half inch union 30A by means of a one-half inch by 1½ inch nipple 32A, and the outlet side of union 30A is connected to the inlet side of elbow-shaped pipe 21 by means of a second one-half inch by 1½ inch nipple 32B. The outlet side of elbow-shaped pipe 21 is connected to second end 16 of upper housing 12 by means of a one-half inch close nipple 31A. Upper housing 12 is rotatable on an axis that is perpendicular to that of flexible pipe 11.

Second end (not shown) of lower housing 13 is placed in communication with the interior of the lower region of the container by means of a lower piping assembly 35. Lower piping assembly 35 is comprised of a T-shaped pipe 22, three one-half inch ball valves 29B-D, and associated fittings. The inlet side of the first ball valve 29B is fitted with a coupling 37 for placing ball valve 29B in communication with the interior of the lower region of the container. The outlet side of the first ball valve 29B is connected to the inlet side of a one-half inch union 30B by means of a one-half inch by 1½ inch nipple 32C, and the outlet side of union 30B is connected to the lower inlet port 22A of T-shaped pipe 22 by means of a second one-half inch by 1½ inch nipple 32D. Second end 16 of lower housing 13 is connected to the inlet side of the second ball valve 29C by means of a one-half inch close nipple 31B. The outlet side of ball valve 29C is connected to the upper inlet port 22B of T-shaped pipe 22 by means of a one-half inch close nipple 31C. The outlet port 22C of T-shaped pipe 22 is connected to the inlet side of the third ball valve 29D, which serves as the container's drain valve, by means of a third one-half inch by 1½ inch nipple 32E. Lower housing 13 also is rotatable on an axis that is perpendicular to flexible pipe 11.

If shield 18 or sleeve 19, or both, are damaged, ball valves 29A-B should be closed. Ball valve 29D should be opened so that any liquid in flexible pipe 11 can be drained. Shield 18 should be compressed against spring 20, exposing upper housing 12. Housing nut 23 on upper housing 12 should then be loosened, and flexible pipe 11 should be removed from first end (not shown) of passage (not shown) of upper housing 12. Once disconnected, union 30A should be loosened, and upper housing 12 can be rotated off the axis of flexible pipe 11. This permits shield 18 to be removed. Because spacers 25 fit snugly around flexible pipe 11 and have an outer diameter that is slightly less than the inner diameter of shield 18, spacers 25 will not impede the removal of shield 18.

Although spacers 25 are placed such that they do not restrict the telescopic engagement of shield 18 and sleeve 19, their outer diameter is greater than the inner diameter of sleeve 19, and sleeve 19 cannot be removed over spacers 25. In order to remove sleeve 19, flexible pipe 11 must be disconnected from lower housing 13 as well. Sleeve 19 should be raised until lower housing 13 is exposed. Housing nut 23 on lower housing 13 should then be loosened, and flexible pipe 11 should be removed from first end (not shown) of passage (not shown) of lower housing 13. Once both ends of flexible pipe 11 have been disconnected, sleeve 19 also can be removed. When shield 18 or sleeve 19, or both, have been repaired or replaced, the sight gauge section should be reassembled in the reverse order to that by which it was disassembled. When sight gauge 10 is in use, ball valve 29D should be closed, and ball valves 29A-C should be open.

Shield 18, sleeve 19, and flexible pipe 11 must be sufficiently transparent to enable the level of liquid contained in flexible pipe 11 to be determined visually. As shown in FIG. 2, a spherical float 27 can be placed inside flexible pipe 11 to improve the visibility of the level of the liquid contained in pipe 11. Float 27 should be of a color that enhances its visibility (e.g., fluorescent orange). Float 27 must be buoyant in the liquid contained in the container, and must, therefore, be less dense than the liquid. It must also, of course, be inert to and not be soluble in the liquid. Float 27 may be hollow or solid and may be fabricated from wood, cork, or a suitable polymeric resin. A float stopping means 28 should be placed in the passages 14 of upper housing 12 and lower housing 13 to prevent float 27 from passing into the container through upper piping assembly 34 or being discharged through lower piping assembly 35. Float stopping means 28 must not prevent the flow of liquid through the housing passages 14.

Figure 3:
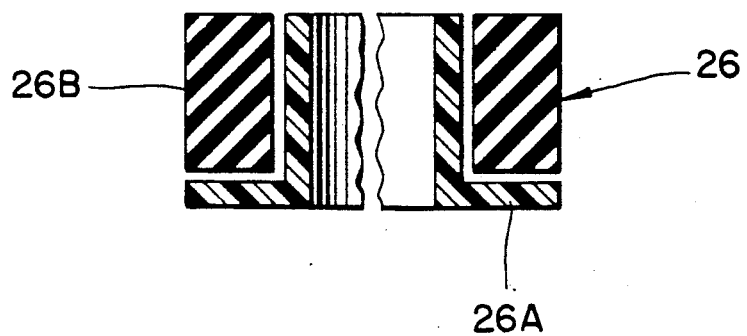
FIG. 3 is an enlarged, cross-sectional view of the seal assembly of the housing depicted in FIG. 2.

FIG. 2 also details the attachment of flexible pipe 11 to first end 15 of either housing's passage 14. Pipe 11 passes through housing nut 23 and a seal assembly 26 and inserts into first end 15 of passage 14. As shown in FIG. 3, the seal assembly 26 is comprised of a polytetrafluoroethylene insert 26A surrounded by a rubber sleeve 26B. Housing nut 23 engages threads (not shown) on the outer surface of housings 12 and 13 and crushes seal assembly 26, forming a liquid-tight seal around flexible pipe 11.

Figure 4:
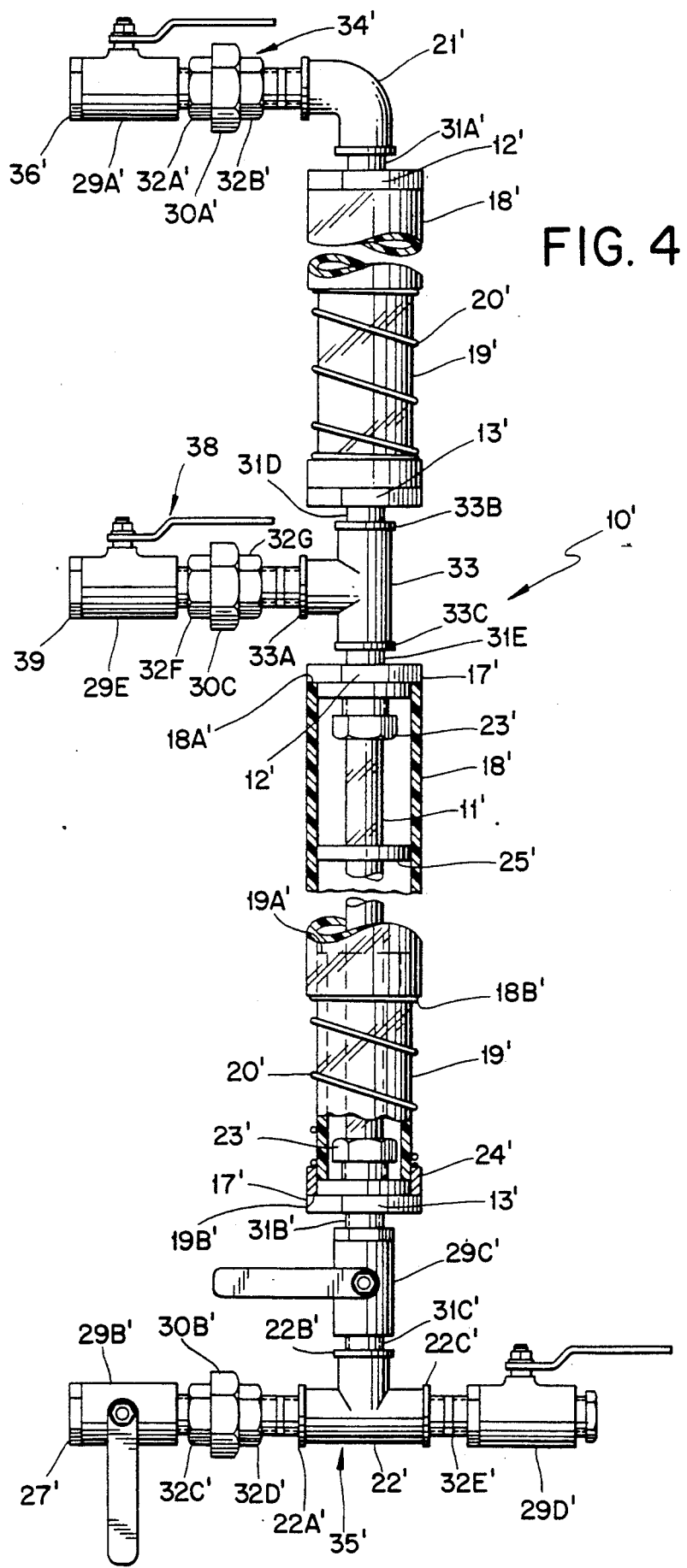
FIG. 4 is a side view of a multi-section sight gauge and preferred connecting means.

Referring to FIG. 4, sight gauge 10' may be formed of two or more sections, each comprising a flexible pipe 11', an upper housing 12', a lower housing 13', a shield 18', a sleeve 19', a spring 20', and spacers 25'. Upper housing 12' of the uppermost sight gauge section is placed in communication with the interior of the upper region of the container by means of an upper piping assembly 34'. Similarly, lower housing 13' of the lowermost section is placed in communication with the interior of the lower region of the container by means of a lower piping assembly 35'. Sections are joined by intermediate piping assemblies 38. Each intermediate piping assembly 38 is comprised of a T-shaped pipe 33, a one-half inch ball valve 29E, and associate fittings. The inlet side of ball valve 29E is fitted with a coupling 39 for placing ball valve 29E in communication with the interior of the corresponding region of the container. The outlet side of ball valve 29E is connected to the inlet side of a one-half inch union 30C by means of a one-half inch by 1½ inch nipple 32F, and the outlet side of union 30C is connected to the center inlet port 33A of T-shaped pipe 33 by means of a second one-half inch by 1½ inch nipple 32G. Second end (not shown) of lower housing 13' of the superior section is connected to the upper inlet port 33B of T-shaped pipe 33 by means of a one-half inch close nipple 31D. The outlet port 33C of T-shaped pipe 33 is connected to second end (not shown) of upper housing 12' of the inferior section by means of a one-half inch close nipple 31E.

Because intermediate piping assembly 38 joins lower housing 13' to upper housing 12' of two serially mounted sight gauge sections, those housings are not independently rotatable. When shield 18' or sleeve 19', or both, of any sight gauge section are damaged, ball values 29A'-B' and 29E should be closed, and ball value 29D' should be opened so that any liquid in flexible pipe 11' can be drained. Shield 18' of the uppermost section should be compressed against spring 20', exposing upper housing 12'. Housing nut (not shown) on upper housing 12' should then be loosened, and flexible pipe (not shown) should be removed from the first end (not shown) of the passage (not shown) of upper housing 12'. Once disconnected, union 30A' should be loosened, and upper housing 12' can be rotated off the axis of flexible pipe (not shown). This permits shield 18' of the uppermost section to be removed. Because spacers 25' fit snugly around flexible pipe (not shown) and have an outer diameter that is slightly less than the inner diameter of shield 18', spacers 25' will not impede the removal of shield 18'.

Although spacers 25' are placed such that they do not restrict the telescopic engagement of shield 18' and sleeve 19' of the uppermost section, their outer diameter is greater than the inner diameter of sleeve 19' and sleeve 19' cannot be removed over spacers 25'. In order to remove sleeve 19' of the uppermost section, flexible pipe (not shown) should be disconnected from lower housing 13' as well. Sleeve 19' should be raised until lower housing 13' is exposed. Housing nut (not shown) on lower housing 13' should then be loosened, and flexible pipe (not shown) should be removed from first end (not shown) of passage (not shown) of lower housing 13'. Once both ends of flexible pipe (not shown) have been disconnected, sleeve 19' also can be removed. If shield 18' or sleeve 19', or both, of the uppermost section are damaged, it or they can now be repaired or replaced, and the sight gauge section can be reassembled in the reverse order to that by which it was disassembled.

If shield 18' or sleeve 19', or both, in any other section are damaged, shield 18' of the next inferior section should be compressed against spring 20', exposing upper housing 12'. Housing nut 23' on upper housing 12' should then be loosened, and flexible pipe 11' should be removed from first end (not shown) of passage (not shown) of upper housing 12'. Once disconnected, union 30C should be loosened, and lower housing 13' and upper housing 12' can be rotated off the axis of flexible pipe 11'. This permits shield 18' to be removed and, if damaged, repaired or replaced. Because spacers 25' fit snugly around flexible pipe 11' and have an outer diameter that is slightly less than the inner diameter of shield 18', spacers 25' will not impede the removal of shield 18'. If sleeve 19' of this lower section is damaged, pipe 11' must be disconnected from lower housing 13', and shield 19' removed in the manner described above. If shield 18' or sleeve 19', or both, of a lower section are damaged, this procedure should be repeated until the damaged section has been disassembled, and the damaged components have been repaired or replaced. The sight gauge sections should be reassembled in the reverse order to that by which they were disassembled. When sight gauge 10' is in use ball value 29D' should be closed, and ball values 29A'–C' and 29E should be open.

Figure 5:
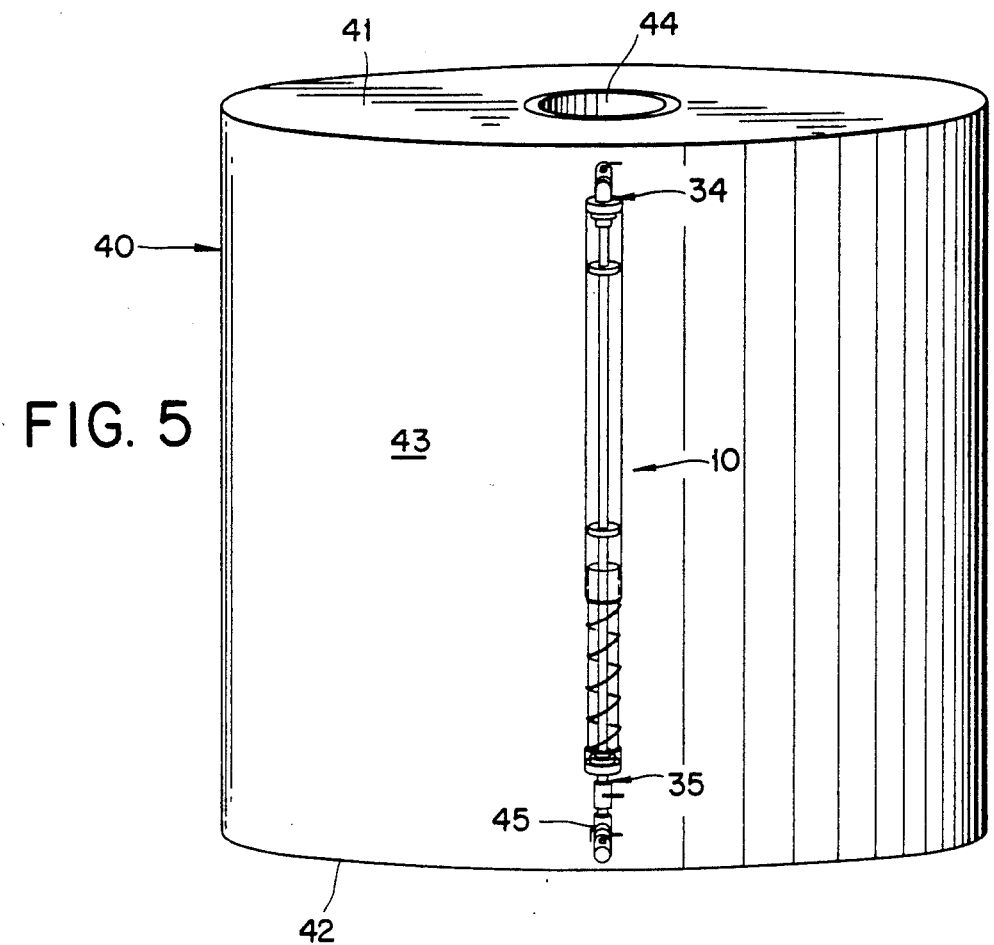
FIG. 5 is a perspective view of the sight gauge of FIG. 1 mounted on a vertical container.
Figure 6:
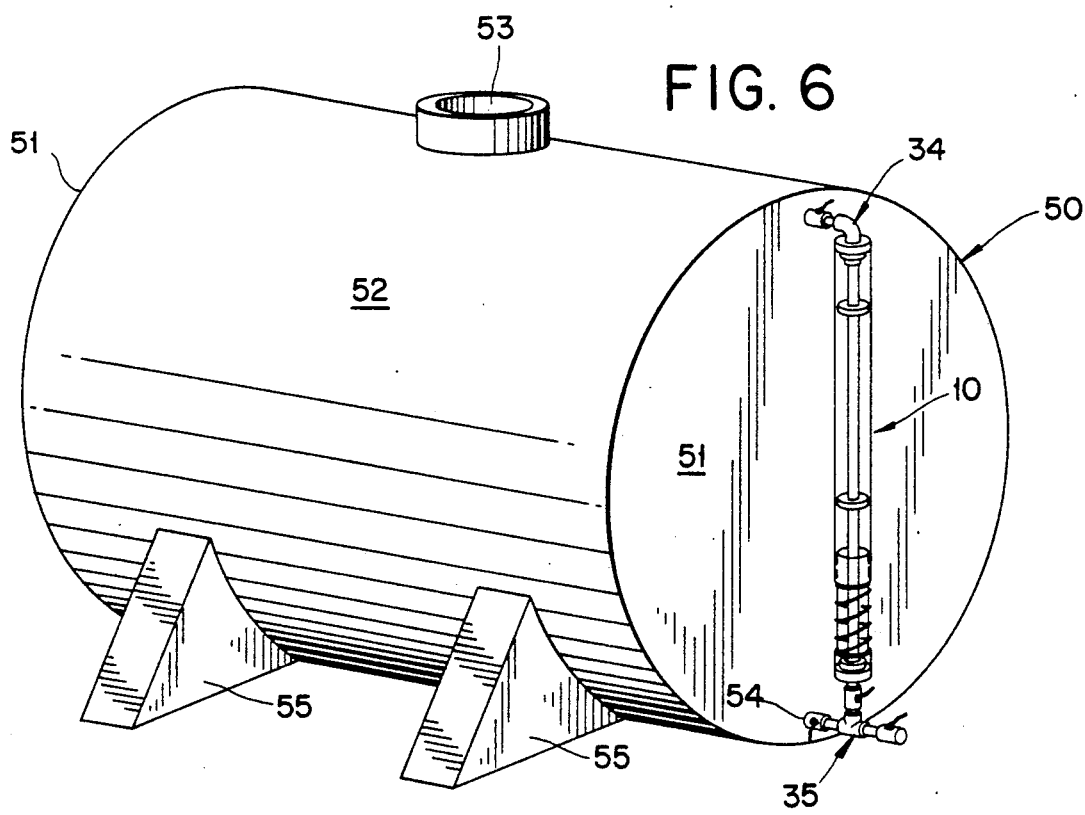
FIG. 6 is a perspective view of the sight gauge of FIG. 1 mounted on a horizontal container.

FIG. 5 and FIG. 6 show sight gauge 10 of FIG. 1 mounted on two different container designs. In FIG. 5, gauge 10 is shown mounted on a vertical container 40. Container 40 has a top surface 41, a bottom surface 42, and a continuous side wall 43. The container 40 is equipped with a fill opening 44 and a drain opening 45. The drain pipe (not shown) and drain valve (not shown) of container 40 can form elements of lower piping assembly 35.

FIG. 6 depicts gauge 10 mounted on a horizontal container 50. Container 50 has two end caps 51 and a continuous circumferential wall 52. Container 50 is equipped with a fill opening 53, a drain opening 54, and a plurality of lateral supports 55. The drain pipe (not shown) and drain valve (not shown) of container 50 can also form elements of lower piping assembly 35.

The use of detachable couplings, unions, nipples, housing nuts, rotatable housings, and a telescoping shield and sleeve permit quick and easy replacement of a shield or sleeve that has been damaged by stresses caused by fluctuations in temperature or pressure or by bulging or contraction during filling or draining.

We claim:

1. A vertically mountable sight gauge, having one or more serially connectable sections, for visually determining the level or the volume, or both, of liquid stored in a container having upper and lower interior regions, said gauge comprising:
    (a) for each section, a straight length of substantially transparent, flexible pipe;
    (b) for each section, an upper housing and a lower housing, each housing having (i) a passage therethrough having a first end and a second end, said first end of each said passage being attached to an end of said flexible pipe, and (ii) a flange that is substantially concentric with said second end of said passage;
    (c) for each section, a substantially transparent, rigid shield surrounding said flexible pipe, defining a continuous, inner wall surface and a continuous, outer wall surface and respective inner and outer diameters, and having a top end and a bottom end and a circumferential top edge that conforms to and abuts said flange on said upper housing;
    (d) for each section, a substantially transparent, rigid sleeve surrounding said flexible pipe, defining a continuous, inner wall surface and a continuous, outer wall surface and respective inner and outer diameters, having a top end and a bottom end and a shoulder surrounding said sleeve's bottom end, said shoulder having a circumferential bottom edge that conforms to and abuts said flange on said lower housing, and having an outer diameter that is less than said shield's inner diameter, such that said sleeve telescopically engages said shield;
    (e) for each section, resilient biasing means bearing against said shield's bottom end, surrounding and overlapping said sleeve, and bearing against said shoulder, so as to urge said shield into engagement with said upper housing and said sleeve into engagement with said lower housing;
    (f) means for placing said second end of said passage in said upper housing of the uppermost of said serially connectable sections in communication with the interior of the upper region of said container; and
    (g) means for placing said second end of said passage in said lower housing of the lowermost of said serially connectable sections in communication with the interior of the lower region of said container.

2. The vertically mountable sight gauge of claim 1 wherein a plurality of spacers separate each shield's inner wall surface from said flexible pipe that said shield surrounds.

3. The vertically mountable sight gauge of claim 1 wherein each biasing means is a coil, compression spring.

4. The vertically mountable sight gauge of claim 1 wherein for each serially connectable section, said upper housing has a diameter less than said shield's inner diameter and said upper housing's flange has a width equal to or greater than said shield's thickness, such that said shield surrounds said upper housing and said shield's circumferential top edge abuts said upper housing's flange, and said lower housing has a diameter less than said sleeve's inner diameter and said lower housing's flange has a width equal to or greater than said shoulder's thickness, such that said sleeve surrounds said lower housing and said shoulder's circumferential bottom edge abuts said lower housing's flange.

5. The vertically mountable sight gauge of claim 1 wherein each shield and each sleeve are cylindrical.

6. The vertically mountable sight gauge of claim 1 wherein each sleeve is shorter than each shield.

7. The vertically mountable sight gauge of claim 1 wherein each shield and each sleeve are graduated such that the approximate level or volume, or both, of liquid stored in said container can be visually determined.

8. The vertically mountable sight gauge of claim 1 wherein each of said upper housings and each of said lower housings is rotatable around an axis that is perpendicular to that of said flexible pipe.

9. The vertically mountable sight gauge of claim 2 wherein for each serially connectable section, said upper housing has a diameter less than said shield's inner diameter and said upper housing's flange has a width equal to or greater than said shield's thickness, such that said shield surrounds said upper housing and said shield's circumferential top edge abuts said upper housing's flange, and said lower housing has a diameter less than said sleeve's inner diameter and said lower housing's flange has a width equal to or greater than said shoulder's thickness, such that said sleeve surrounds said lower housing and said shoulder's circumferential bottom edge abuts said lower housing's flange.

10. The vertically mountable sight gauge of claim 3 wherein for each serially connectable section, said upper housing has a diameter less than said shield's inner diameter and said upper housing's flange has a width equal to or greater than said shield's thickness, such that said shield surrounds said upper housing and said shield's circumferential top edge abuts said upper housing's flange, and said lower housing has a diameter less than said sleeve's inner diameter and said lower housing's flange has a width equal to or greater than said shoulder's thickness, such that said sleeve surrounds said lower housing and said shoulder's circumferential bottom edge abuts said lower housing's flange.

11. The vertically mountable sight gauge of claim 8 wherein for each serially connectable section, said upper housing has a diameter less than said shield's inner diameter and said upper housing's flange has a width equal to or greater than said shield's thickness, such that said shield surrounds said upper housing and said shield's circumferential top edge abuts said upper housing's flange, and said lower housing has a diameter less than said sleeve's inner diameter and said lower housing's flange has a width equal to or greater than said shoulder's thickness, such that said sleeve surrounds said lower housing and said shoulder's circumferential bottom edge abuts said lower housing's flange.

12. The vertically mountable sight gauge of claim 4 wherein each shield and each sleeve are cylindrical.

13. The vertically mountable sight gauge of claim 6 wherein each shield and each sleeve are cylindrical.

14. The vertically mountable sight gauge of claim 8 wherein each shield and each sleeve are cylindrical.

15. The vertically mountable sight gauge of claim 8 wherein each biasing means is a coil, compression spring.

16. The vertically mountable sight gauge of claim 6 wherein each biasing means is a coil, compression spring.

17. The vertically mountable sight gauge of claim 5 wherein each biasing means is a coil, compression spring.

18. The vertically mountable sight gauge of claim 5 wherein a plurality of spacers separate each shield's inner wall surface from said flexible pipe that said shield surrounds.

19. The vertically mountable sight gauge of claim 6 wherein a plurality of spacers separate each shield's inner wall surface from said flexible pipe that said shield surrounds.

20. The vertically mountable sight gauge of claim 9 wherein each sleeve is shorter than each shield.

21. The vertically mountable sight gauge of claim 10 wherein each sleeve is shorter than each shield.

22. The vertically mountable sight gauge of claim 12 wherein each biasing means is a coil, compression spring.

23. The vertically mountable sight gauge of claim 18 wherein for each serially connectable section, said upper housing has a diameter less than said shield's inner diameter and said upper housing's flange has a width equal to or greater than said shield's thickness, such that said shield surrounds said upper housing and said shield's circumferential top edge abuts said upper housing's flange, and said lower housing has a diameter less than said sleeve's inner diameter and said lower housing's flange has a width equal to or greater than said shoulder's thickness, such that said sleeve surrounds said lower housing and said shoulder's circumferential bottom edge abuts said lower housing's flange.

24. The vertically mountable sight gauge of claim 23 wherein each sleeve is shorter than each shield.

25. The vertically mountable sight gauge of claim 11 wherein a plurality of spacers separate each shield's inner wall surface from said flexible pipe that said shield surrounds.

26. The vertically mountable sight gauge of claim 11 wherein each biasing means is a coil, compression spring.

27. The vertically mountable sight gauge of claim 11 wherein each shield and each sleeve are cylindrical.

28. The vertically mountable sight gauge of claim 26 wherein a plurality of spacers separate each shield's inner wall surface from said flexible pipe that said shield surrounds.

29. The vertically mountable sight gauge of claim 26 wherein each shield and each sleeve are cylindrical.

30. The vertically mountable sight gauge of claim 28 wherein each shield and each sleeve are cylindrical.

31. The vertically mountable sight gauge of claim 29 wherein a plurality of spacers separate each shield's inner wall surface from said flexible pipe that said shield surrounds.

32. The vertically mountable sight gauge of claim 29 wherein each sleeve is shorter than the shield.

33. The vertically mountable sight gauge of claim 22 wherein a plurality of spacers separate each shield's inner wall surface from said flexible pipe that said shield surrounds.

34. The vertically mountable sight gauge of claim 33 wherein each sleeve is shorter than each shield.

35. The vertically mountable sight gauge of claim 34 wherein each of said upper housings and each of said lower housings is rotatable around an axis that is perpendicular to that of said flexible pipe.

36. The vertically mountable sight gauge of claim 35 wherein each shield and each sleeve are made of acrylic resin.

37. The vertically mountable sight gauge of claim 36 wherein each flexible pipe is made of polyvinyl chloride.

38. The vertically mountable sight gauge of claim 37 wherein an opaque float is placed in said flexible pipe to mark the height of a liquid column contained in said flexible pipe and said upper housings and lower housings are equipped with means to prevent said float from exiting said second end of said upper housing's and lower housings' passages without preventing the flow of liquid through said passages.

39. A container having said sight gauge of claim 1 mounted thereon, Wherein said container has a continuous, circumferential side wall, a bottom surface, a top surface, a fill opening, a drain opening, a drain pipe, and a drain valve located in said drain pipe to control the draining of said container, said sight gauge's length is approximately equal to said container's depth, and said sight gauge is mounted such that said lower end of said flexible pipe of the lowermost section is at approximately the same level as said container's bottom surface and said upper end of said flexible pipe of the uppermost section is approximately at the same level as said container's top surface.

40. A container having said sight gauge of claim 1 mounted thereon, wherein said container has two end caps, a continuous, circumferential wall, a fill opening, a drain opening, a drain pipe, and a valve located in said drain pipe to control the draining of said container, said sight gauge being mounted on one of said end caps, and said flexible pipe's length is approximately equal to said end cap's height.

41. The container of claim 39 wherein said means for placing said second end of said passage in said lowermost housing in communication with said container comprises a T-shaped pipe having a lower inlet port for receiving said liquid from said container, an upper inlet port for receiving said liquid from said flexible pipe, and an outlet port through which said liquid from said container and said flexible pipe is discharged and valve means for controlling said liquid flowing between said drain opening and said lower inlet port, valve means for controlling said liquid flowing between said second end and said upper inlet port, and valve means for controlling said liquid flowing from said outlet port.

42. The container of claim 39 wherein said means for placing said second end of said passage in said uppermost housing in communication with said container is an elbow-shaped pipe and is equipped with a valve means for controlling said liquid flowing between said container and said elbow-shaped pipe.

43. The container of claim 40 wherein said means for placing said second end of said passage in said lower housing in communication with said container comprises a T-shaped pipe having a lower inlet port for receiving said liquid from said container, an upper inlet port for receiving said liquid from said flexible pipe, and an outlet port through which said liquid from said container and said flexible pipe is discharged and valve means for controlling said liquid flowing between said drain opening and said lower inlet port, valve means for controlling said liquid flowing between said second end and said upper inlet port, and valve means for controlling said liquid flowing from said outlet port.

44. The container of claim 40 wherein said means for placing said second end of said passage in said upper housing in communication with said container is an elbow-shaped pipe and is equipped with a valve means for controlling said liquid flowing between said container and said elbow-shaped pipe.

45. A container having the sight gauge of claim 35 mounted thereon, wherein said container has a continuous, circumferential side wall, bottom surfaces and top surfaces, a fill opening, a drain opening, a drain pipe, and a valve located in said drain pipe to control the draining of said container, said flexible pipe's length is approximately equal to said container's depth, and said sight gauge is mounted such that said flexible pipe's lower end is at approximately the same level as said container's bottom surface and said flexible pipe's upper end is approximately at the same level as said container's top surface.

46. The container of claim 45 wherein said means for placing said second end of said passage in said lower housing in communication with said container comprises a T-shaped pipe having a lower inlet port for receiving said liquid from said container, an upper inlet port for receiving said liquid from said flexible pipe, and an outlet port through which said liquid from said container and said flexible pipe is discharged and valve means for controlling said liquid flowing between said drain opening and said lower inlet port, valve means for controlling said liquid flowing between said second end and said upper inlet port, and valve means for controlling said liquid flowing from said outlet port.

47. The container of claim 46 wherein said means for placing said second end of said passage in said upper housing in communication with said container comprises an elbow-shaped pipe equipped with valve means for controlling the flow of liquid between said container and said elbow-shaped pipe.

48. The vertically mountable sight gauge of claim 47 wherein each shield and each sleeve are made of acrylic resin.

49. The vertically mountable sight gauge of claim 48 wherein each flexible pipe is made of polyvinyl chloride.

50. The vertically mountable sight gauge of claim 49 wherein each shield and each sleeve is graduated such that the approximate level or volume, or both, of liquid stored in said container can be visually determined.

51. The vertically mountable sight gauge of claim 50 wherein an opaque float is placed in said flexible pipe to mark the height of a liquid column contained in said flexible pipe and said upper housings and lower housings are equipped with means to prevent said float from exiting said second end of said upper housing's and lower housing's passages without preventing the flow of liquid through said passages.

52. The container of claim 51 wherein said sight gauge is comprised of two or more serially connectable sections are joined by means for placing said second end of said passage in said upper housing of one of said sections in communication with said second end of said passage in said lower housing of said next superior serially connectable section and said corresponding interior region of said container.

53. The container of claim 52 wherein said means for placing sight gauge sections in communication with each other and with said corresponding interior region of said container is a T-shaped pipe equipped with valve means for controlling liquid flowing between said container and said T-shaped pipe.

54. A container having said sight gauge of claim 35 mounted thereon, wherein said container has two end caps, a continuous, circumferential wall, a fill opening, a drain opening, a drain pipe, and a valve located in said drain pipe to control the draining of said container, said sight gauge being mounted on one of said end caps, and said flexible pipe's length is approximately equal to said end cap's height.

55. The container of claim 54 wherein said means for placing said second end of said passage in said lower housing in communication with said container comprises a T-shaped pipe having a lower inlet port for receiving said liquid from said container, an upper inlet port for receiving said liquid from said flexible pipe, and an outlet port through which said liquid from said container and said flexible pipe is discharged and valve means for controlling said liquid flowing between said drain opening and said lower inlet port, valve means for controlling said liquid flowing between said second end and said upper inlet port, and valve means for controlling said liquid flowing from said outlet port.

56. The container of claim 55 wherein said means for placing said second end of said passage in said upper housing in communication with said container is an elbow-shaped pipe and is equipped with a valve means for controlling said liquid flowing between said container and said elbow-shaped pipe.

57. The vertically mountable sight gauge of claim 56 wherein each shield and each sleeve are made of acrylic resin.

58. The vertically mountable sight gauge of claim 57 wherein each flexible pipe is made of polyvinyl chloride.

59. The vertically mountable sight gauge of claim 58 wherein each shield and each sleeve is graduated such that the approximate level or volume, or both, of liquid stored in said container can be visually determined.

60. The vertically mountable sight gauge of claim 59 wherein an opaque float is placed in said flexible pipe to mark the height of a liquid column contained in said flexible pipe and said upper and lower housings are equipped with means to prevent said float from exiting said second end of said upper and lower housings' passages without preventing the flow of liquid through said passages.

61. The container of claim 60 wherein said sight gauge is comprised of two or more serially connectable sections are joined by means for placing said second end of said passage in said upper housing of one of said sections in communication with said second end of said passage in said lower housing of said next superior serially connectable section and said corresponding interior region of said container.

62. The container of claim 61 wherein said means for placing sight gauge sections in communication with each other and with said corresponding interior region of said container is a T-shaped pipe equipped with valve means for controlling liquid flowing between said container and said T-shaped pipe.

* * * * *